(12) United States Patent
Kang et al.

(10) Patent No.: US 9,578,479 B2
(45) Date of Patent: Feb. 21, 2017

(54) SMART DEVICE RESOURCE COMBINING METHOD AND APPARATUS THEREOF

(71) Applicant: ELECTRONICS AND TELECOMMUNICATIONS RESEARCH INSTITUTE, Daejeon (KR)

(72) Inventors: Dong-Oh Kang, Daejeon (KR); Chang-Seok Bae, Daejeon (KR); Kyu-Chang Kang, Daejeon (KR); Joon-Young Jung, Daejeon (KR); Jin-Young Moon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 137 days.

(21) Appl. No.: 14/448,105

(22) Filed: Jul. 31, 2014

(65) Prior Publication Data

US 2015/0039769 A1 Feb. 5, 2015

(30) Foreign Application Priority Data

Aug. 1, 2013 (KR) ........................ 10-2013-0091478

(51) Int. Cl.
| | | |
|---|---|---|
| *G06F 15/173* | (2006.01) | |
| *H04W 4/20* | (2009.01) | |
| *H04W 4/02* | (2009.01) | |

(52) U.S. Cl.
CPC ............. *H04W 4/206* (2013.01); *H04W 4/023* (2013.01)

(58) Field of Classification Search
CPC .............................. H04W 4/023; H04W 4/206
See application file for complete search history.

(56) References Cited

U.S. PATENT DOCUMENTS

| | | | |
|---|---|---|---|
| 9,076,006 B1 * | 7/2015 | Saylor .................. | G06F 21/606 |
| 2012/0131458 A1 * | 5/2012 | Hayes .............. | H04N 21/41407 |
| | | | 715/716 |
| 2012/0176976 A1 * | 7/2012 | Wells ................ | H04W 52/0219 |
| | | | 370/329 |
| 2012/0208514 A1 * | 8/2012 | Park ...................... | G06F 3/0484 |
| | | | 455/418 |
| 2013/0145287 A1 | 6/2013 | Jung et al. | |

FOREIGN PATENT DOCUMENTS

| | | |
|---|---|---|
| KR | 10-2010-0107507 | 10/2010 |
| KR | 10-2011-0073219 | 6/2011 |
| KR | 10-2011-0076153 | 7/2011 |
| KR | 10-2012-0023836 | 3/2012 |
| KR | 10-2012-0050245 | 5/2012 |
| KR | 10-2013-0063449 | 6/2013 |

* cited by examiner

*Primary Examiner* — Mohamed Wasel
(74) *Attorney, Agent, or Firm* — Staas & Halsey LLP (57) ABSTRACT

A smart device includes a storage unit storing identity information of a counterpart device, a sensing unit sensing an approach by the counterpart device, a control unit determining whether the counterpart device sensed by the sensing unit corresponds to the identity information stored in the storage unit, and a combining processing unit combining a resource of the counterpart device if the counterpart device is determined by the control unit to correspond to the identity information.

7 Claims, 8 Drawing Sheets

SMART DEVICE RESOURCE COMBINING METHOD AND APPARATUS THEREOF

CROSS-REFERENCE TO RELATED APPLICATIONS

This application claims the benefit of Korean Patent Application No. 10-2013-0091478, filed with the Korean Intellectual Property Office on Aug. 1, 2013, the disclosure of which is incorporated herein by reference in its entirety.

BACKGROUND

1. Technical Field

Disclosed are a combining method of smart devices and an apparatus thereof. More specifically, a combining method of resources of smart devices and an apparatus thereof are disclosed.

2. Background Art

Following the popularization of laptops, use of smart phones or smart pads has been increasing dramatically. Many cases are found that a person owns and uses several smart devices such as a laptop, a smart phone, and a smart pad. In the meantime, needs for sharing resources among the smart devices have been increasing as well in order to improve the smart devices' computing performances or to facilitate data sharing.

Generally, data or a screen of a counterpart device has been shared or controlled through a remote access via a network in order to share resources among the smart devices, such as the smart phones, the smart pads, etc. Remote desktop protocols such as vnc (Virtual Networking Computing) and rdp (Remote Desktop Protocol) and file share protocols or file system share protocols such as ftp (File Transfer Protocol) or nfs (Network File System) have been used.

However, users have had to inconveniently input the network IP address or network port number of a counterpart device, using an application program, or designate a pre-inputted device profile of the counterpart device. That is, these services have been only available in specific application programs and have not been capable of being combined through a user interface, making it difficult to use and limiting to file share or screen share.

The related arts to the present invention are disclosed in Korean Patent Application No. 2010-7019011 (METHOD, SYSTEM, COMPUTER PROGRAM, AND APPARATUS FOR AUGMENTING MEDIA BASED ON PROXIMITY DETECTION) and Korean Patent Publication No. 2011-0073219 (METHOD FOR SHARING INFORMATION BASED ON SOCIAL NETWORK SERVICE IN PORTABLE TERMINAL AND PORTABLE TERMINAL PERFORMING THE SAME), but they do not suggest a solution to problems described above.

SUMMARY

The present invention provides a method for combining resources among smart devices with increased usability and convenience.

A smart device disclosed in the disclosure may include a storage unit configured to store identity information of a counterpart device, a sensing unit configured to sense approach by the counterpart device, a control unit configured to determine whether the counterpart device sensed by the sensing unit corresponds to the identity information stored in the storage unit, and a combining processing unit configured to combine a resource of the counterpart device if the counterpart device is determined by the control unit to correspond to the identity information.

In an exemplary embodiment, a user interface of the counterpart device and a user interface of the smart device can be combined, by the combining processing unit, to be outputted on a display screen of the smart device.

In an exemplary embodiment, at least one of data, an application service and an input/output unit of the counterpart device can be combined with at least one of data, an application service and an input/output unit of the smart device by the combining processing unit.

A combining method of smart devices disclosed in the disclosure may include sensing approach by a counterpart device; determining whether the sensed counterpart device corresponds to pre-stored identity information; and combining a resource of the counterpart device with a resource of the smart device if the counterpart device corresponds to the pre-stored identity information.

In an exemplary embodiment, the combining may include combining a user interface of the counterpart device with a user interface of the smart device to be outputted on a display screen of the smart device.

In an exemplary embodiment, the combining may include combining at least one of data, an application service and input/output unit of the counterpart device with at least one of data, an application service and an input/output unit of the smart device.

DETAILED DESCRIPTION

Following description exemplifies only the principles of the present invention. Even if they are not described or illustrated clearly in the present specification, one of ordinary skill in the art can embody the principles of the present invention and invent various apparatuses within the concept and scope of the present invention. The use of the conditional terms and embodiments presented in the present specification are intended only to make the concept of the present invention understood, and they are not limited to the embodiments and conditions mentioned in the specification.

In addition, all the detailed description on the principles, viewpoints and embodiments and particular embodiments of the present invention should be understood to comprise structural and functional equivalents to them. The equivalents comprise not only currently known equivalents but also those to be developed in future, that is, all devices invented to perform the same function, regardless of their structures.

For example, block diagrams of the present invention should be understood to show a conceptual viewpoint of an exemplary circuit that embodies the principles of the present invention. Similarly, all the flowcharts, state conversion diagrams, pseudo codes and the like can be expressed substantially in a computer-readable medium, and whether or not a computer or a processor is described distinctively, they should be understood to express various processes operated by a computer or a processor.

Functions of various devices illustrated in the drawings including a functional block expressed as a processor or a similar concept can be provided not only by using hardware dedicated to the functions, but also by using hardware capable of running proper software for the functions. When a function is provided by a processor, the function may be provided by a single dedicated processor, single shared processor, or a plurality of individual processors, part of which can be shared.

The apparent use of a term, 'processor', 'control' or similar concept, should not be understood to exclusively refer to a piece of hardware capable of running software, but should be understood to comprise a digital signal processor (DSP), hardware, and ROM, RAM and non-volatile memory for storing software, implicatively. Other known and commonly used hardware may be comprised therein, too.

In the claims of the present specification, an element expressed as a means for performing a function described in the detailed description is intended to comprise all methods for performing the function including all formats of software, such as combinations of circuits for performing the intended function, firmware/microcode and the like. To perform the intended function, the element is cooperated with a proper circuit for performing the software. The present invention defined by claims includes diverse means for performing particular functions, and the means are connected with each other in a method requested in the claims. Therefore, any means that can provide the function should be understood to be an equivalent to what is figured out from the present specification.

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

The disclosure explains a method of combining smart devices and an apparatus thereof.

Figure 1:
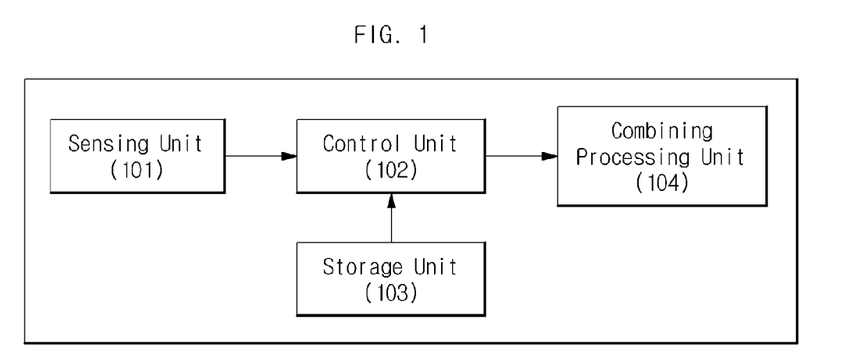
FIG. 1 is a block diagram showing a smart device in accordance with an embodiment of the disclosure.

FIG. 1 is a block diagram showing a smart device in accordance with an embodiment of the disclosure.

A smart device may refer to a computing electronic device having mobility and user interface resources, such as a notebook, a smart phone, a smart pad, car navigator, car black box, smart home control devices etc. Here, the combining may include any one of sharing resources between the smart devices, creating a server-client relationship between the smart devices, and controlling by a user a plurality of the smart devices as if they were a single device.

The combinable resources of the smart device may include input/output unit (e.g., a mouse, a keyboard, a screen), data (including files and directories), or computing function of the smart device. They can be provided and served to the other devices by the smart device. They can be shared in a form of combination of several functions of the smart devices. Each combinable resource has an operational procedure as the sequence of combinable functions.

With reference to FIG. 1, the smart device includes a storage unit 103 configured to store identity information of a counterpart device, a sensing unit 101 configured to sense approach by the counterpart device, a control unit 102 configured to determine whether the counterpart device sensed by the sensing unit 101 corresponds to the identity information stored in the storage unit 103, and a combining processing unit 104 configured to combine a resource of the counterpart device with a resource of the smart device if the counterpart device is determined by the control unit 103 to correspond to the identity information.

The combining processing unit 104 can perform a procedure for combining the resources of the devices. That is, the combining processing unit 104 can receive and process information about combinable resources of the counterpart device from the counterpart device. For example, in a case that the first device as a main agent combines the resource of the second device to a resource of the first device, it receives information about combinable resources from the second device and combines the resources. Here, the combinable resources may include combining a user interface screen of the counterpart device with a user interface of the smart device and additionally, if necessary, may further include combining at least one of data, an application service, or an input/output unit of the counterpart device with corresponding data, application service, or input/output unit of the smart device. The combining of the user interface screen of the counterpart device can be realized by having each user interface of the smart device and the counterpart device combined and outputted on a display screen of the smart device. For example, in a case that the first device as a main agent is combined with the second device, either the both screens of the first device and the second device at the same time or the selected screen that the user selects can be displayed on the screen of the first device. The storage unit 103 stores identity information of the counterpart device. Here, the identity information can include an ID of the counterpart device and relationship information with the counterpart device. The relationship information may define a relationship between the smart device and the counterpart device, which are can be used by the same user or different users. In case of different users, the relationship information may further include a social relationship between users, such as family, friend, coworker, and the like.

The storage unit 103 is located usually in the smart device as depicted in FIG. 1, but is not restricted to the present embodiment. For example, the storage unit 103 can also be in a server which the both of the smart device and the counterpart device can access to. In this case, the smart device can acquire and store the identity information through communication with the server.

In addition, information necessary to combine the resources of the devices can be included in the identity information, and in this case, the identity information may further include combinable resource information of the counterpart device. In one embodiment, the combining processing unit 104 can receive combinable resource information of the counterpart device from the counterpart device and store it together with the identification information of the counter device. Alternatively, the user can configure combinable resource information of the counterpart device.

The sensing unit 101 may detect and sense a signal or strength of the signal generated by the counterpart device. Here the signal may include a wireless signal or an optical signal, and a RSSI (Received Signal Strength Indicator) may be used for the wireless signal.

Figure 2:
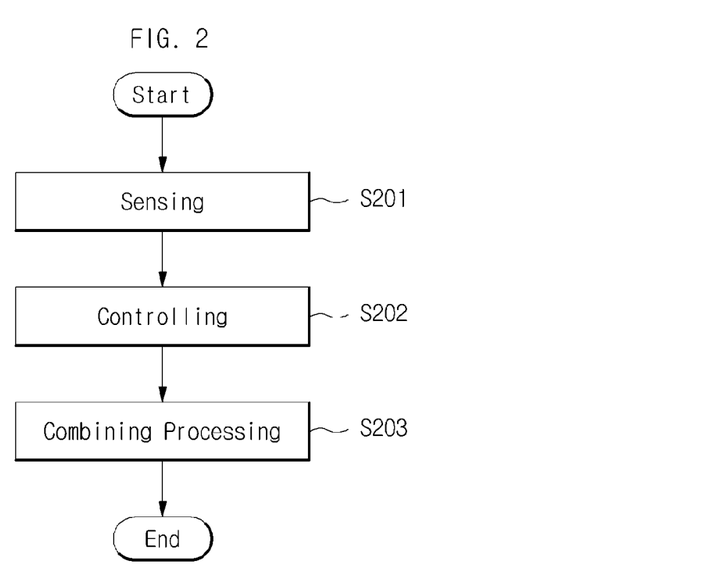
FIG. 2 is a flow diagram showing a method of combining smart devices in accordance with an embodiment of the disclosure.

FIG. 2 is a flow diagram showing a method of combining smart devices in accordance with an embodiment of the disclosure.

With reference to FIG. 2, the combining method of smart devices includes sensing S201 which senses approach by a counterpart device, controlling S202 to determine whether the sensed counterpart device corresponds to pre-stored identity information, and combining processing S203 which combines a resource of the counterpart device if the counterpart device is determined by the controlling S202 to correspond to the identity information.

In the step of the combining processing S203, information about combinable resource of the counterpart device may be received from the counterpart device and processed, and the combinable resource may include combining a user interface screen of the counterpart device with a user interface of the smart device. Here, the combining of the user interface screen of the counterpart device can be configured by having each user interface of the smart device and the counterpart device combined and outputted on a display screen of the smart device. In addition, the combinable resources may further include combining at least one of data, an application service, or an input/output unit of the counterpart device with corresponding data, application service, or input/output unit of the smart device.

In addition, the identity information can include an ID of the counterpart device and relationship information with the counterpart device. The identity information can also include combinable resource information of the counterpart device.

In the step of sensing S201, a signal or strength of the signal generated by the counterpart device can be detected and sensed.

The detailed explanation of the other combining methods of smart devices will be omitted due to duplicated explanation of the smart device in FIG. 1.

Hereinafter, embodiments of a smart device and a method of combining the smart devices disclosed in the description will be explained with reference to drawings. Here, the explanation will be provided based on a user interface.

In the embodiment, user interfaces of devices connected remotely through networks can be combined easily with a relationship (sociality) between the devices and may be used as a single smart device. Here, the sociality may include a mutual relationship in human social networks and/or device social networks. The user interfaces of remote smart devices connected through the networks can be combined easily by use of the sociality.

A user may determine the social relationship between the devices for combining their resources (for example, the user interfaces) and approach the devices to identify mutually thereby controlling the plurality of devices through one user interface of the device. Through the combined user interface, the user can use a plurality of devices as a single device.

In addition, by use of the device social relationship similar to the human social relationship, user interfaces of the devices can be combined conveniently without configuring settings or executing application programs repeatedly.

In addition, the combining devices may be performed by detecting approach by the devices and combing the resources of the devices. That is, a plurality of smart devices can identify the devices approaching through wireless networks and combine the user interfaces by use of the device sociality defining the resource sharing functions, thus data of the plurality of devices can be stored and shared as if it is a single device and input/output resources can be shared.

Figure 3:
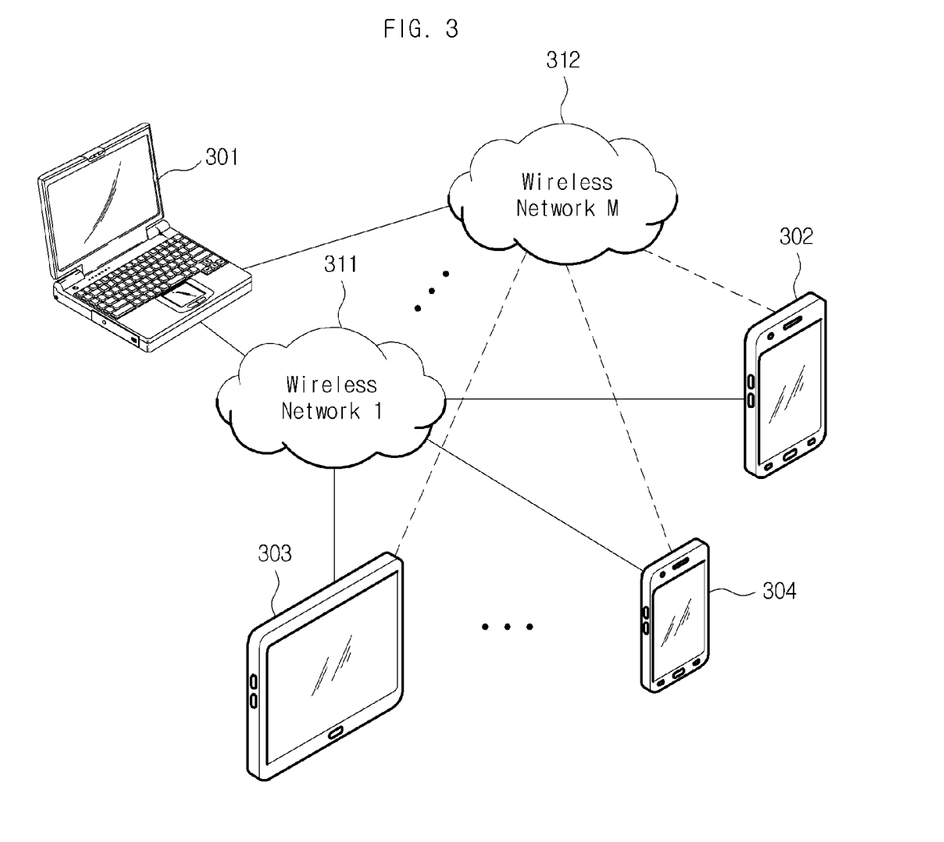
FIG. 3 illustrates an overall system configuration in an embodiment.

FIG. 3 illustrates an overall system configuration of an embodiment.

With reference to FIG. 3, the overall system includes a plurality of smart devices 301, 302, 303, 304 and at least one of physical structures of wireless networks 311, 312 to which the smart devices are connected. The smart devices 301, 302, 303, 304 may share data, a user interface screen, an application service, an input/output (I/O) unit and the like, and perform defining and storing the device sociality which defines combinable resources with the counterpart devices.

Figure 4A:
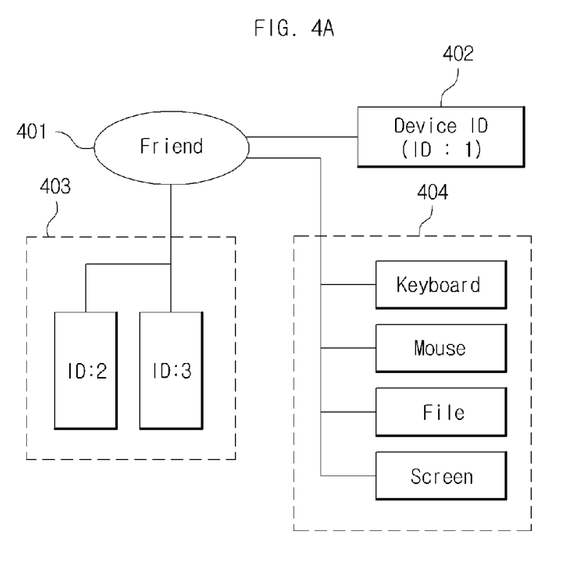
FIGS. 4a and 4b illustrate exemplary configuration of the device sociality according to an embodiment.
Figure 4B:
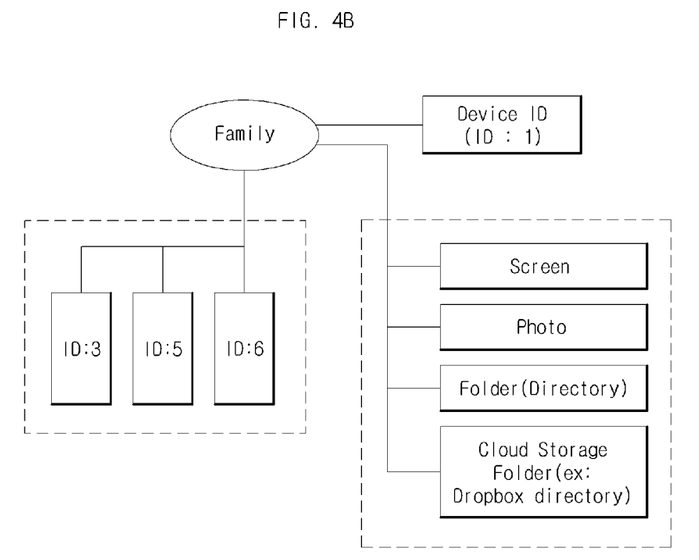

FIGS. 4a and 4b illustrate exemplary configuration of the device sociality according to an embodiment. The device sociality can be configured and stored by a user in a scripting language and for example the scripting language such as JSON or XML may be used as an embodiment.

With reference to FIG. 4a, a top most component can be a device social relationship name 401 and a device ID 402. Here, the device ID 402 is a basic attribute of the device sociality, and may include information of sharable resources of the device 404. The device social relationship name 401 may include ID information of the counterpart device corresponding to the social relationship 403, and further include sharable resource information of the counterpart device. The device social relationship name 401 in FIG. 4a is defined as 'friend'.

FIG. 4b shows another device social relationship defined as 'family.'

In addition, the smart device may include a sensing unit detecting approach by a counterpart device. The detecting approach by a counterpart device may be performed by estimating a distance from the device through wireless networks such as Bluetooth or Wi-Fi, by recognizing the approach through NFC, or by recognizing the distance by estimating strength of an optical signal (or infrared light) being radiated from the counterpart device.

Figure 5:
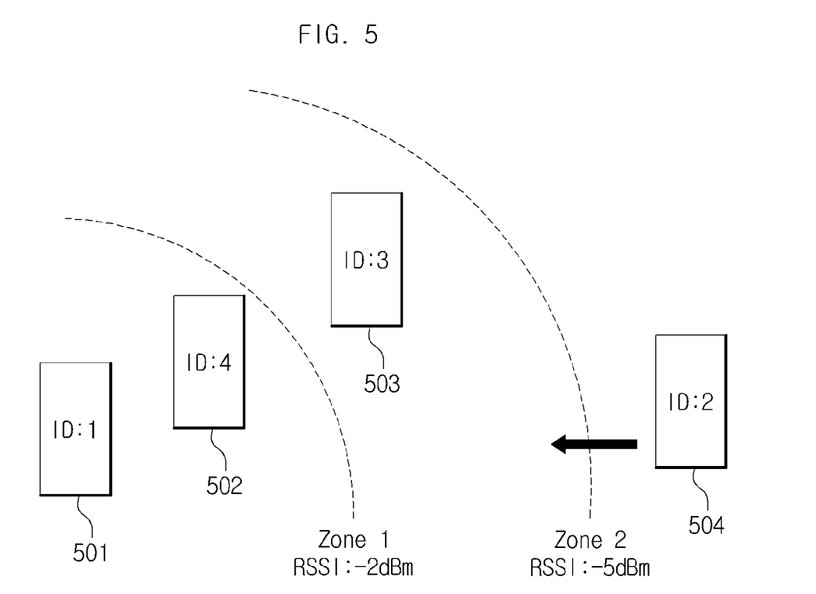
FIG. 5 illustrates a process of identifying approach by a counterpart device.

FIG. 5 illustrates a process of identifying approach by a counterpart device. The counterpart devices 502, 503, 504 may be classified by signal strength and their resources are combined to the counterpart device having higher level than a specific strength. For example, if the resource combining is only for the counterpart devices entering into the Zone 1 in FIG. 5, the ID 4 device 502 becomes a combining subject device. This is represented in Table 1. Although the RSSI has been used to recognize an approaching device in the embodiment, other mechanism can be used to recognize the approaching device.

TABLE 1

| Device ID | RSSI (dBm) | Zone |
|---|---|---|
| 2 | −1 | 1 (−2 dBm) |
| 3 | −3 | 2 (−5 dBm) |
| 4 | −6 | External |

When the counterpart device 502 approaches, each device 501, 502, determines whether there is a social relationship to which the approaching device belongs in the stored device sociality. If there is a corresponding social relationship, the device notifies its own combinable resources indicated in the social relationship to the counterpart device. When the devices notify mutually combinable resources, it is determined that which device (501 or 502) will display a combined user interface. When the combined user interface is displayed on the ID 1 device 501, the ID 1 device 501 displays the combined user interface on the screen thereby providing an input/output of computing and becomes a user interface client for the ID 4 device 502. The ID 4 device 502 acts as a user interface server which processes user interface input/output requests from the ID 1 device 501 displaying the screen and notifies the results.

Figure 6:
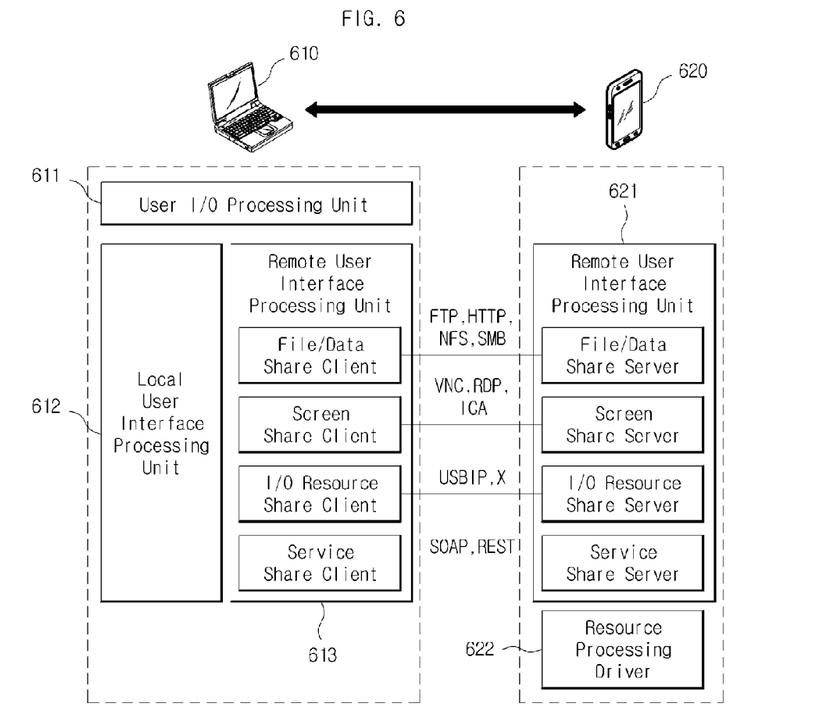
FIG. 6 is a conceptual diagram of server-client according to combination of user interfaces.

FIG. 6 is a conceptual diagram of server-client according to combination of user interfaces.

With reference to FIG. 6, a notebook 610 (the ID 1 device in FIG. 5) may include a user I/O processing unit 611, a local user interface processing unit 612, and a remote user interface processing unit 613, and the remote user interface processing unit 613 may include a file/data share client, a screen share client, an I/O resource share client, and a service share client. A smart phone 620 (the ID 4 device in FIG. 5) may include the remote user interface processing unit 621 and a resource processing driver 622, and the remote user interface unit 621 may include a file/data share client, a screen share client, an I/O resource share server, and a service share server. The remote user interface processing unit 613 of the notebook 610 and the remote user interface processing unit 621 of the smart phone 620 are corresponding to each other and may exchange information according to each protocol. Here, an example of the protocol used in the user interface input/output may be remote desktop protocols such as VNC or RDP for an input/output of screen and pointing, and FTP, HTTP, or NFS for file sharing.

Figure 7:
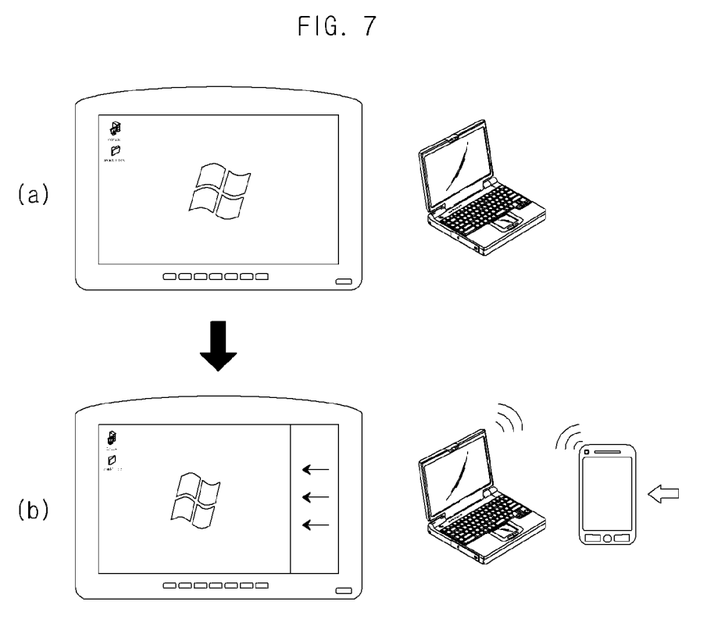
FIG. 7 and FIG. 8 illustrate how the user interfaces of the devices shown in FIG. 6 are combined in accordance with an embodiment.
Figure 8:
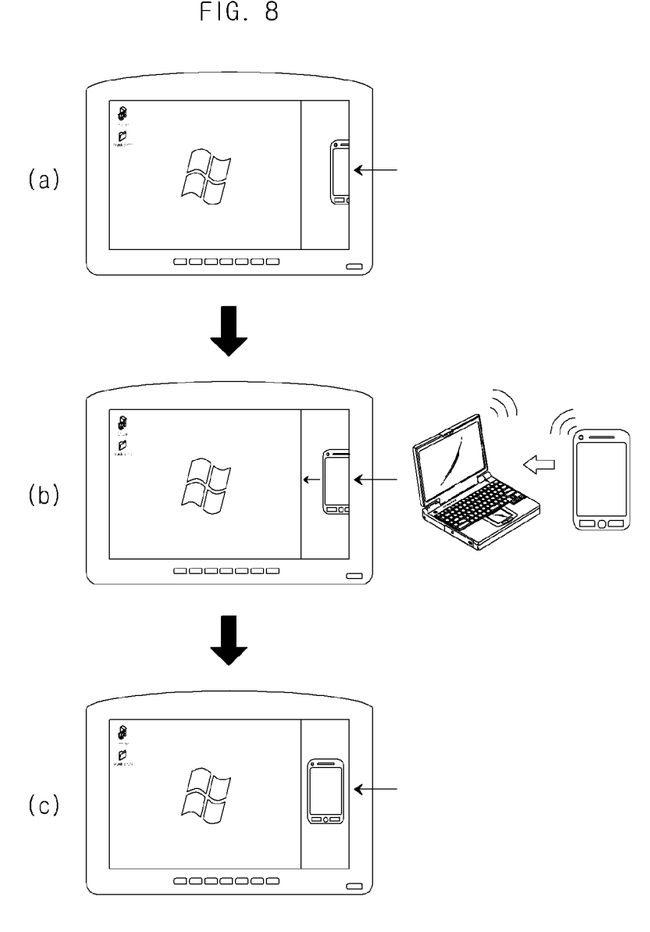

FIG. 7 and FIG. 8 illustrate how the user interfaces of the devices shown in FIG. 6 are combined in accordance with an embodiment.

FIG. 7(*a*) depicts a notebook's display screen when a smart phone does not approach to it, and FIG. 7(*b*) depicts a process the notebook's user interface display screen is being contracted to combine the smart phone's user interface and display it on the notebook's display screen when the smart phone approaches. This is for preparing a space for the counterpart device's user interface screen to be displayed on the device's screen by contracting its own screen. The device screen can be contracted with a same aspect ratio, or by leaving necessary components on the screen and moving the rest of the components to a menu or a background screen.

On which device to display the screen can be determined by considering computing performances and screen sizes of each device. FIG. 7 represents an embodiment of selecting a device having a larger screen and in a case of a smart phone and a notebook, the notebook is determined as a combining user interface display device due to its larger screen.

FIG. 8 illustrates an embodiment of a process of displaying the counterpart device's user interface screen on the contracted screen described in FIG. 7.

With reference to FIG. 8, a smart phone approaches a notebook, the smart phone's user interface screen enters into the contracted space on the notebook's display screen in the order of 8(a), (b), and (c). That is, the user interface of the device, i.e., the smart phone to be combined moves and enters into the contracted screen space on the combined user interface of the notebook. The example of the movement includes sliding the device to be inserted into the displayed screen, which happens at the same time with the being contracted so that the device user interface having the display screen may be seen as if it was pushed and contracted by the inserting device. Or, various embodiments can be realized such as appearing abruptly in the secured space of the display screen as a popup or moving into the secured space when rotating the device.

The user interface combining may be applicable to three or more numbers of devices. For example, in a case where a plurality of devices are connected and their user interfaces are combined to a single device, a user can select the device to have the user interface of the selected device displayed in the space being secured by contracting the screen of the single device. As an example when a user interface screen of a smart phone combined to a notebook is clicked for longer than 3 seconds by a left button on a mouse, it can be switched to the other smart phone's user interface screen.

When the screens are combined through the process, the user interfaces of the two devices, the notebook and the smart phone are overlapped and when one of them is selected, computing resource, an application service, or data of the corresponding device can be used. Also combined user interfaces can move data of a device to the counterpart device by a user interface. The combined user interfaces enables the two devices to be used as if they were a single device.

Figure 9:
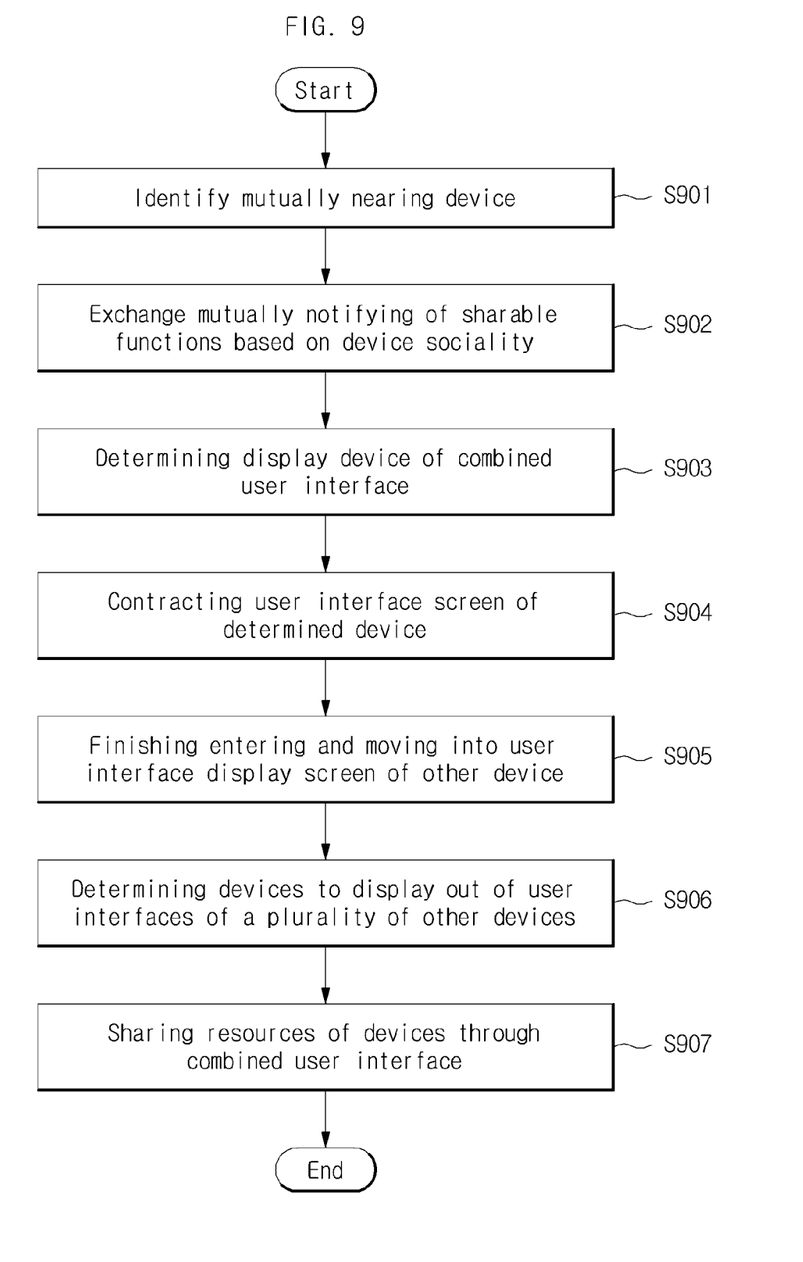
FIG. 9 is a flow diagram showing how the user interfaces are combined in accordance with an embodiment.

The overall operations of the combining user interfaces can be summarized as a flow diagram in FIG. 9.

FIG. 9 is a flow diagram showing how the user interfaces are combined in accordance with an embodiment.

With reference to FIG. 9, firstly each device identifies approaches mutually at S901. The mutual identifying is completed by that the devices recognize mutually through P2P, discover the counterpart devices automatically through exchanging device ID, set up a server-client relationship, exchange/synchronize device sociality, and transfer the sociality mutually. The devices notify mutually combinable resources based on the device sociality at S902. Then a device for displaying a combined user interface is determined at S903. A user interface screen of the determined device is contracted at S904, and a user interface screen of the counterpart device enters into the contracted screen and finishes the movement at S905. Device to display out of the user interfaces of the plurality of counterpart devices is determined at S906, and resources of the devices are shared through the combined user interface at S907.

As so far, when a user nears devices that have a device sociality between them, the user interfaces of the devices are combined intuitively without manual settings thereby enabling the devices to combine conveniently and providing improved usability. Also, unlike simply exchanging data or screens of the devices, enabling two devices or more to act as if they were a single device through combining user interfaces may contribute to increase productivity in an environment of a plurality of the devices. Particularly, through this function of having a new virtual device for a plurality of I/Os, it will be possible to provide various related application services.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A smart device comprising:
    a storage configured to store identity information of a counterpart device;
    a sensor configured to sense an approach by the counterpart device by estimating a distance or a signal strength, through a wireless network, between the smart device and the counterpart device;
    a controller configured to determine whether the counterpart device of which approach was sensed corresponds to the identity information stored in the storage; and
    a combining processor configured to combine a resource of the counterpart device of which approach was sensed with a resource of the smart device if the counterpart device of which approach was sensed corresponds to the identity information.

2. The smart device of claim 1, wherein a user interface of the counterpart device of which approach was sensed and a user interface of the smart device are combined, by the combining processor, to be outputted on a display screen of the smart device.

3. The smart device of claim 1, wherein at least one of data, an application service and an input/output unit of the counterpart device of which approach was sensed is combined with at least one of data, an application service and an input/output unit of the smart device by the combining processor.

4. A combining method of smart devices, comprising:
    a smart device sensing an approach of a counterpart device by estimating a distance or a signal strength, through a wireless network, between the smart device and the counterpart device;
    determining whether the counterpart device of which approach was sensed corresponds to pre-stored identity information; and
    combining a resource of the counterpart device of which approach was sensed with a resource of the smart device if the counterpart device of which approach was sensed corresponds to the pre-stored identity information.

5. The method of claim 4, wherein the combining includes combining a user interface of the counterpart device of which approach was sensed with a user interface of the smart device to be outputted on a display screen of the smart device.

6. The method of claim 4, wherein the combining includes combining at least one of data, an application service and input/output unit of the counterpart device of which approach was sensed with at least one of data, an application service and an input/output unit of the smart device.

7. The smart device of claim 1, wherein the resource of the counterpart device of which approach was sensed overlaps with the resource of the smart device if the counterpart device of which approach was sensed corresponds to the identity information.

* * * * *